(12) United States Patent
Bang et al.

(10) Patent No.: US 10,785,339 B2
(45) Date of Patent: Sep. 22, 2020

(54) HANDLING OF EVENT NOTIFICATIONS IN NON-STANDARD FORMATS

(71) Applicant: Avigilon Corporation, Vancouver (CA)

(72) Inventors: Yubin Bang, Coquitlam (CA); Kaushik Choudhary, Vancouver (CA); Shaun P. Marlatt, North Vancouver (CA)

(73) Assignee: Avigilon Corporation, Vancouver (CA)

( * ) Notice: Subject to any disclaimer, the term of this patent is extended or adjusted under 35 U.S.C. 154(b) by 0 days.

(21) Appl. No.: 15/876,019

(22) Filed: Jan. 19, 2018

(65) Prior Publication Data

US 2018/0213051 A1      Jul. 26, 2018

Related U.S. Application Data

(60) Provisional application No. 62/448,920, filed on Jan. 20, 2017.

(51) Int. Cl.
*H04L 29/08* (2006.01)
*H04N 7/18* (2006.01)
*H04L 29/06* (2006.01)
*G08B 13/196* (2006.01)

(52) U.S. Cl.
CPC ........... *H04L 67/2823* (2013.01); *H04N 7/18* (2013.01); *H04N 7/183* (2013.01); *G08B 13/196* (2013.01); *H04L 65/605* (2013.01)

(58) Field of Classification Search
None
See application file for complete search history.

(56) References Cited

U.S. PATENT DOCUMENTS

| | | | |
|---|---|---|---|
| 2006/0274148 A1* | 12/2006 | Millar | H04N 7/188 348/143 |
| 2007/0150460 A1* | 6/2007 | Evans | G08B 21/0275 |
| 2011/0058034 A1* | 3/2011 | Grass | H04N 7/18 348/143 |
| 2011/0299835 A1 | 12/2011 | Fleming | |
| 2012/0075469 A1 | 3/2012 | Oskin et al. | |
| 2018/0018371 A1* | 1/2018 | Miller | G06F 16/24568 |

OTHER PUBLICATIONS

International Search Report and Written Opinion dated Apr. 11, 2018, issued by the Canadian Intellectual Property Office in connection with PCT Application No. PCT/CA2018/050068, filed Jan. 19, 2018.
Onvif, "Onvif(TM) Core Specification", Dec. 2017, retrieved from the Internet <https://www.onvif.org/specs/core/ONVIF-Core-Specification-v1712.pdf>.

\* cited by examiner

*Primary Examiner* — Dakshesh D Parikh
(74) *Attorney, Agent, or Firm* — Daniel Hammond

(57) ABSTRACT

Methods, systems, and techniques for handling of event notifications in non-standard formats. An event notification sent from an event notification sending device of a video surveillance system is received at an event notification handling device of the system. The event notification is in a format not natively supported by at least one device of the system. The event notification is translated into a format supported by the at least one device, with the supported format being defined in a list of non-standard formats. A rule associated with the event notification is applied to perform an action. Prior to receiving the event notification, an initialization method may be performed in which the event notification handling device subscribes to receive the event notification.

31 Claims, 10 Drawing Sheets

```xml
<?xml version="1.0" encoding="UTF-8" standalone="no" ?>
<Root>
<ACCEvent Name="Face Detection Events">                                                          ← 420
  <DeviceEvent Name="FaceDetection" NamespaceName="tnsmanufacturer" Topic="tns1:VideoSource/
tnsmanufacturer:FaceDetection">                                                                  ← 410
    <Data>
      <SimpleItemDescription Name="RegexEventDataTokenName" value="^Face$"/>          ⎫
      <SimpleItemDescription Name="RegexEventDataStartTokenValue" value="^(1)$"/>     ⎬ 430
      <SimpleItemDescription Name="RegexEventDataEndTokenValue" value="^(0)$"/>       ⎭
    </Data>
  </DeviceEvent>
</ACCEvent>
</Root>
```

FIG. 4

HANDLING OF EVENT NOTIFICATIONS IN NON-STANDARD FORMATS

CROSS-REFERENCE TO RELATED APPLICATION

Pursuant to 35 U.S.C. § 119(e), this application claims the benefit of provisional U.S. Patent Application No. 62/448,920, filed Jan. 20, 2017, and entitled "User-defined Event Handling", the entirety of which is hereby incorporated by reference herein.

TECHNICAL FIELD

The present subject-matter relates to video surveillance, and more particularly to handling event notifications from devices of a video surveillance system that are expressed in non-standard formats.

BACKGROUND

A video surveillance system has to be able to integrate with a number of devices, such as sensors and access control devices, from a variety of different manufacturers. These sensors and other devices may have different capabilities as well as different communication protocols and command functions. To facilitate integration, a number of standards have been developed and are continuing to evolve. ONVIF (originally an acronym for Open Network Video Interface Forum) is such a standard to facilitate interoperability of network video products from different manufacturers.

It is, however, difficult for any standard to fully cover all of the possibilities between devices of different manufacturers. The standards may not be complete or may only cover basic communication protocols. Additionally or alternatively, these devices may have proprietary message structures, new features, and even different formatting for event notifications not included in the standard.

For example, an ONVIF compliant video camera with video analytics from one manufacturer may have a unique proprietary message structure, which may not be defined in the standard. A driver may be written to translate the unique proprietary messages to standardized messages that are understood or supported by a particular video surveillance system, but there may be messages with no equivalents. A known solution is to ignore such messages with no equivalents, but this is suboptimal. It is also costly to develop a driver for each device that may suffer from such issues, given the number of different manufacturers.

It would facilitate integration if video surveillance systems could be improved to better handle one or more such issues.

SUMMARY

According to a first aspect, there is provided a method comprising: receiving, at an event notification handling device of a video surveillance system, an event notification from an event notification sending device of the video surveillance system, wherein the event notification is in a format not natively supported by at least one device of the video surveillance system; translating, at the event notification handling device, the event notification into a format supported by the at least one device of the video surveillance system, wherein the format supported by the at least one device of the video surveillance system is defined in list of non-standard formats; and applying a rule associated with the event notification to perform an action.

The event notification sending device may be a video surveillance camera.

The event notification handling device may be a workstation or client device.

The event notification handling device and the event notification sending device may be the same device.

The event notification handling device and event notification sending device may be different devices.

The list of non-standard formats may comprise a name of the event as generated by the event notification sending device, a name of a manually-defined event, and a mapping of fields of the event notification to fields of the manually-defined event.

The fields of the manually-defined event may comprise a name of a token, a starting value of the token, and an ending value of the token.

The list of non-standard formats may be stored as a definition file, the definition file comprising a script expressed using a data exchange language.

The method may further comprise setting up the rule by: displaying names of different manually-defined events, wherein the event notification received at the event notification handling device corresponds to one of the different manually-defined events; receiving a selection of the name of the manually-defined event corresponding to the event notification received at the event notification handling device; displaying actions to be performed in response to the event notification; and receiving a selection of one of the actions. Applying the rule may comprise performing the one of the actions in response to the event notification being received.

The method may further comprise, prior to receiving the notification, subscribing to receive the event notification from the event notification sending device.

The method may further comprise, prior to subscribing to receive the event notification: querying the device for the list of events supported by the event notification sending device, wherein the list of events lists an event corresponding to the event notification; determining that the event corresponding to the event notification is not natively supported by the at least one device of the video surveillance system; and determining that the event corresponding to the event notification is listed in a definition file that defines a non-standard format for the event corresponding to the event notification.

The method may further comprise: detecting, at the event notification sending device, an event; and sending the event notification in response to the event.

The event may represent motion having been detected, a person having been detected, or a camera having been tampered with.

According to another aspect, there is provided a method comprising: connecting to an event notification sending device that comprises part of a video surveillance system; querying the event notification sending device for a list of events supported by the device; for each of at least one event comprising part of the list of events: determining whether an event notification for the event supported by the device is in a non-standard format stored in a definition file; and when the event notification for the event supported by the device is in the non-standard format stored in the definition file, subscribing to receive the event from the device.

The method may further comprise, for each of the at least one event comprising part of the list of events and prior to determining whether the event notification is in the non-standard format stored in the definition file, determining that the event supported by the device is not natively supported by at least one other device of the video surveillance system.

The method may further comprise, for each of the at least one event comprising part of the list of events, ignoring the event supported by the device when the event notification for the event supported by the device is in a non-standard format absent from the definition file.

The definition file may be a script expressed using a data exchange language.

According to another aspect, there is provided a video surveillance system for handling user-defined events, comprising: an event notification sending device; at least one additional device; an event notification handling device comprising a processor coupled to the event notification sending device and the at least one additional device, and a computer-readable storage device coupled to the processor, wherein the computer-readable storage device stores program instructions that, when executed by the processor, cause the processor to perform operations comprising: receiving, from the event notification sending device, an event notification, wherein the event notification is in a format not natively supported by the at least one additional device; translating, at the event notification handling device, the event notification into a format supported by the at least one device of the video surveillance system, wherein the format supported by the at least one device of the video surveillance system is defined in list of non-standard formats; and applying a rule associated with the event notification to perform an action.

The event notification sending device may be a video surveillance camera.

The event notification handling device may be a workstation or client device.

The event notification handling device and the event notification sending device may be the same device.

The event notification handling device and event notification sending device may be different devices.

The list of non-standard formats may comprise a name of the event as generated by the event notification sending device, a name of a manually-defined event, and a mapping of fields of the event notification to fields of the manually-defined event.

The fields of the manually-defined event may comprise a name of a token, a starting value of the token, and an ending value of the token.

The list of non-standard formats may be stored as a definition file, the definition file comprising a script expressed using a data exchange language.

The operations may further comprise setting up the rule by: displaying names of different manually-defined events, wherein the event notification received at the event notification handling device corresponds to one of the different manually-defined events; receiving a selection of the name of the manually-defined event corresponding to the event notification received at the event notification handling device; displaying actions to be performed in response to the event notification; and receiving a selection of one of the actions, and applying the rule may comprise: performing the one of the actions in response to the event notification being received.

The operations may further comprise, prior to receiving the notification, subscribing to receive the event notification from the event notification sending device.

The operations may further comprise, prior to subscribing to receive the event notification: querying the device for the list of events supported by the event notification sending device, wherein the list of events lists an event corresponding to the event notification; determining that the event corresponding to the event notification is not natively supported by the at least one device of the video surveillance system; and determining that the event corresponding to the event notification is listed in a definition file that defines a non-standard format for the event corresponding to the event notification.

The operations may further comprise: detecting, at the event notification sending device, an event; and sending the event notification in response to the event.

The event may represent motion having been detected, a person having been detected, or a camera having been tampered with.

According to another aspect, there is provided a video surveillance system for handling user-defined events, comprising: an event notification sending device; at least one additional device; an event notification handling device comprising a processor coupled to the event notification sending device and the at least one additional device, and a computer-readable storage device coupled to the processor, wherein the computer-readable storage device stores program instructions that, when executed by the processor, cause the processor to perform operations comprising: connecting to the event notification sending device; querying the event notification sending device for a list of events supported by the event notification sending device; for each of at least one event comprising part of the list of events: determining whether an event notification for the event supported by the device is in a non-standard format stored in a definition file; and when the event notification for the event supported by the device is in the non-standard format stored in the definition file, subscribing to receive the event from the device.

The operations may further comprise, for each of the at least one event comprising part of the list of events and prior to determining whether the event notification is in the non-standard format stored in the definition file, determining that the event supported by the device is not natively supported by the at least one additional device.

The operations may further comprise, for each of the at least one event comprising part of the list of events, ignoring the event supported by the event notification sending device when the event notification for the event supported by the event notification sending device is in a non-standard format absent from the definition file.

The definition file may be a script expressed using a data exchange language.

The event notification sending device may be a video surveillance camera.

According to another aspect, there is provided a method for handling user-defined events in a video surveillance system, comprising: receiving a notification of a received event from a device of the video surveillance system where the received event is not on a list of events supported by the video surveillance system; translating the received event into a user-defined event where the user-defined event was defined in a list of available events for the device; and applying a rule associated with the user-defined event in the video surveillance system to execute an action. Further, the device may comprise a video surveillance camera.

According to another aspect, there is provided a video surveillance system for handling user-defined events, comprising: a device; a processor coupled to the device; and a computer-readable storage device storing program instructions that, when executed by the processor, cause the system to perform operations comprising: receiving a notification of a received event from the device of the video surveillance system where the received event is not on a list of events supported by the video surveillance system; translating the received event into a user-defined event where the user-defined event was defined in a list of user-defined from a list of available events for the device; and applying a rule associated with the user-defined event in the video surveillance system to execute an action. Further, according to some example embodiments of the video surveillance system, the device is a video surveillance camera.

According to another aspect, there is provided a non-transitory computer readable medium having stored thereon computer program code that is executable by a processor and that, when executed by the processor, causes the processor to perform the method of any of the foregoing method aspects or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

The detailed description refers to the following figures that illustrate one or more example embodiments, in which:

FIG. 4 illustrates a script block (a part) of an XML script for a "face detection" event according to one example embodiment;

Figure 1:
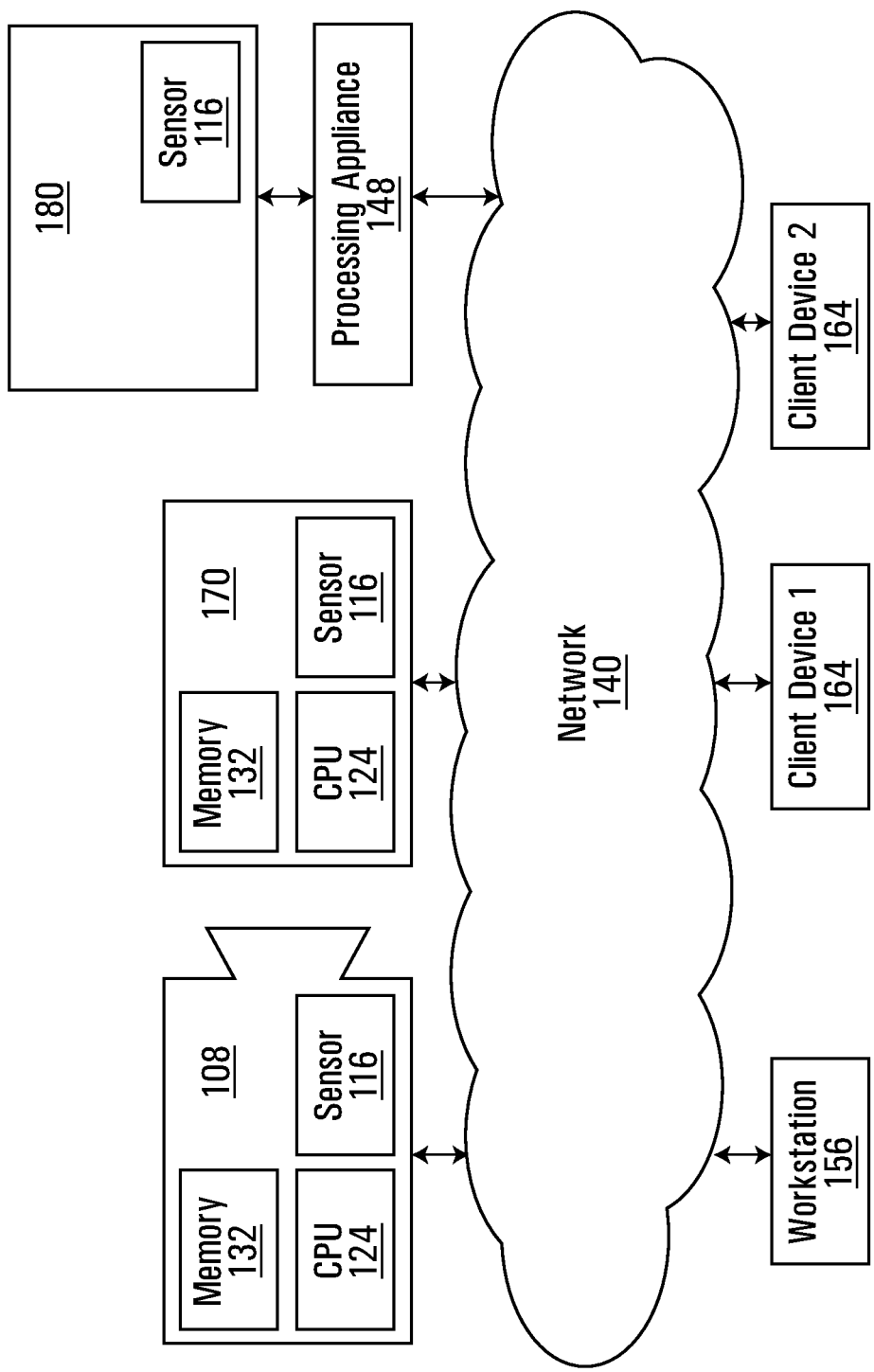
FIG. 1 illustrates a block diagram of connected devices of a video surveillance system according to one example embodiment.

It will be appreciated that for simplicity and clarity of illustration, elements shown in the figures have not necessarily been drawn to scale. For example, the dimensions of some of the elements may be exaggerated relative to other elements for clarity or emphasis. Furthermore, where considered appropriate, reference numerals may be repeated among the figures to indicate corresponding or analogous elements.

DETAILED DESCRIPTION

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling", or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

A plurality of sequential image frames may together form a video captured by the image capture device. Each image frame may be represented by a matrix of pixels, each pixel having a pixel image value. For example, the pixel image value may be a single numerical value for grayscale (such as, for example, 0 to 255) or a plurality of numerical values for colored images. Examples of color spaces used to represent pixel image values in image data include RGB, YUV, CYKM, YCBCR 4:2:2, YCBCR 4:2:0 images.

"Metadata" or variants thereof herein refers to information obtained by computer-implemented analysis of images including images in video. For example, processing video may include, but is not limited to, image processing operations, analyzing, managing, compressing, encoding, storing, transmitting, and/or playing back the video data. Analyzing the video may include segmenting areas of image frames and detecting visual objects, and tracking and/or classifying visual objects located within the captured scene represented by the image data. The processing of the image data may also cause additional information regarding the image data or visual objects captured within the images to be output. That additional information is commonly referred to as "metadata". The metadata may also be used for further processing of the image data, such as drawing bounding boxes around detected objects in the image frames. Metadata, such as the detection of an object in the video, are also events for which notifications are sent if those events have been subscribed to, such as by a user. A "subscribed event" is one for which a notification is sent when such event is detected.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video surveillance system 100 according to an example embodiment. For example, the video surveillance system 100 may be used as a video capture and playback system and includes the hardware and software that perform the processes and functions described herein.

The video surveillance system 100 includes at least one image capture device 108 being operable to capture a plurality of images and produce image data representing the plurality of captured images. The image capture device 108 or camera 108 is an image capturing device and includes security video cameras.

Each image capture device 108 includes at least one image sensor 116 for capturing a plurality of images. The image capture device 108 may be a digital video camera and the sensor 116 may output captured light as a digital data. For example, the sensor 116 may be a CMOS, NMOS, or CCD. In at least one different example embodiment (not depicted), the image capture device 108 may comprise an analog camera connected to an encoder, with the encoder digitizing analog video captured by the analog camera for subsequent processing.

The at least one sensor 116 may be operable to capture light in one or more frequency ranges. For example, the at least one sensor 116 may be operable to capture light in a range that substantially corresponds to the visible light frequency range. In other examples, the at least one sensor 116 may be operable to capture light outside the visible light range, such as in the infrared range and/or ultraviolet range. In other examples, the image capture device 108 may be a multi-sensor camera that includes two or more sensors that are operable to capture light in different frequency ranges. However, the sensor 116 herein comprises any suitable type of sensor depending on the context; for example, a card reader sensor reads cards, a smoke detector sensor detects smoke, a door lock sensor detects open/closed doors, a motion sensor detects motion using infrared light, and an audio sensor detects sound.

The at least one image capture device 108 may include a dedicated camera. It will be understood that a dedicated camera herein refers to a camera whose principal features is to capture images or video. In some example embodiments, the dedicated camera may perform functions associated to the captured images or video, such as but not limited to processing the image data produced by it or by another image capture device 108. For example, the dedicated camera may be a surveillance camera, such as any one of a pan-tilt-zoom camera, dome camera, in-ceiling camera, box camera, and bullet camera.

Additionally or alternatively, the at least one image capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller. In at least some example embodiments, the image capture device 108 may be a mobile device, examples of which include the laptop, tablet, drone device, and smartphone. The mobile device may have its own propulsion unit, such as the drone device; alternatively, the mobile device may lack a propulsion unit, such as the laptop, tablet, and smartphone.

Each image capture device 108 includes one or more processors 124, one or more memory devices 132 coupled to the processors and one or more network interfaces. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) embedded processor, etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions, which may be expressed as computer program code. Typically, the memory device 132 is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 132, and the network interface may be implemented within an SOC. Furthermore, when implemented in this way, a general purpose processor and one or more of a GPU and a DSP may be implemented together within the SOC.

Continuing with FIG. 1, each of the at least one image capture device 108 is connected to a network 140. Each image capture device 108 is operable to output image data representing images that it captures and transmit the image data over the network.

The network 140 may also connect to one or more of a number of other devices, such as a sensor device 170. The sensor device 170 may be a computing resource-constrained sensor-dependent event notification device such as a motion detector with one or more of optical, microwave, and acoustic sensors. The range of possible sensor devices 170 is wide and may comprise card readers, door locking/unlocking devices, radar or IR presence detectors, and smart locks. The sensor devices 170 may also have memory 132, CPU 124, and a sensor 116.

It will be understood that the network 140 may be any suitable communications network that provides reception and transmission of data. For example, the network 140 may be a local area network, external network (such as, for example, a WAN or the Internet) or a combination thereof. In other examples, the network 140 may include a cloud network.

In some examples, the video surveillance system 100 includes a processing appliance 148. The processing appliance 148 is operable to process data output by devices 180 that may not have memory 132 or a CPU 124. The data may include output of the devices' 180 sensors 116, such as data generated in response to sensing video, audio, light, and/or radar. Sensor devices 170 and devices 180 may also contain sensors capable of measuring internal system parameters and parameters in the external environment of the device to generate event notifications.

Examples of sensing parameters in the external environment and generating notifications of such events include sensing any one or more of structural and material conditions of buildings, bridges and dams; air and noise pollution levels; the presence and/or intensity of forest fires; the presence and/or intensity of earthquakes; radiation levels; and security emergencies due to breaches of perimeter access control resulting in the presence of people in unauthorized areas.

The processing appliance 148 also includes one or more processors and one or more memory devices coupled to the one or more processors (CPU). The processing appliance 148 may also include one or more network interfaces. The processing appliance 148 supports devices 180 that may not have network support and/or have limited processing capability for the video surveillance system 100. For convenience of illustration, only one processing appliance 148 is shown; however, it will be understood that the video surveillance system 100 may include any suitable number of processing appliances 148.

For example, and as illustrated, the processing appliance 148 is connected to a device 180 for video capture that may not have a memory 132 or CPU 124 to process image data. The processing appliance 148 may also be used to connect the device 180 to the network 140.

According to one example embodiment, and as illustrated in FIG. 1, the video surveillance system 100 includes at least one workstation 156 (such as, for example, a server), each having one or more processors including graphics processing units (GPUs). At least one workstation 156 may also include storage memory. The workstation 156 receives image data from the image capture device 108 and performs processing of the image data. The workstation 156 may further send commands for managing and/or controlling one or more of the image capture devices 108. The workstation 156 may receive raw image data and other data from the image capture device 108, the sensor device 170, and the device 180. Alternatively or additionally, the workstation 156 may receive image data that has already undergone some intermediate processing, such as processing at the image capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video surveillance system 100 further includes at least one client device 164 connected to the network 140. The client device 164 is used by one or more users to interact with the video surveillance system 100. Accordingly, the client device 164 includes at least one display device and at least one user input device (such as, for example, mouse, keyboard, touchscreen). The client device 164 is operable to display on its display device a user interface for displaying information, receiving user input, and playing back video. For example, the client device may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation and one or more client devices 164.

In some examples, the image surveillance system 100 may be implemented without the workstation 156. Accordingly, image processing functionalities may be performed on a system entity other than the workstation 156 such as, for example, on the one or more image capture devices 108. Alternatively, the image processing functionalities may be shared amongst two or more of the image capture devices 108, processing appliance 148 and client devices 164.

Figure 2:
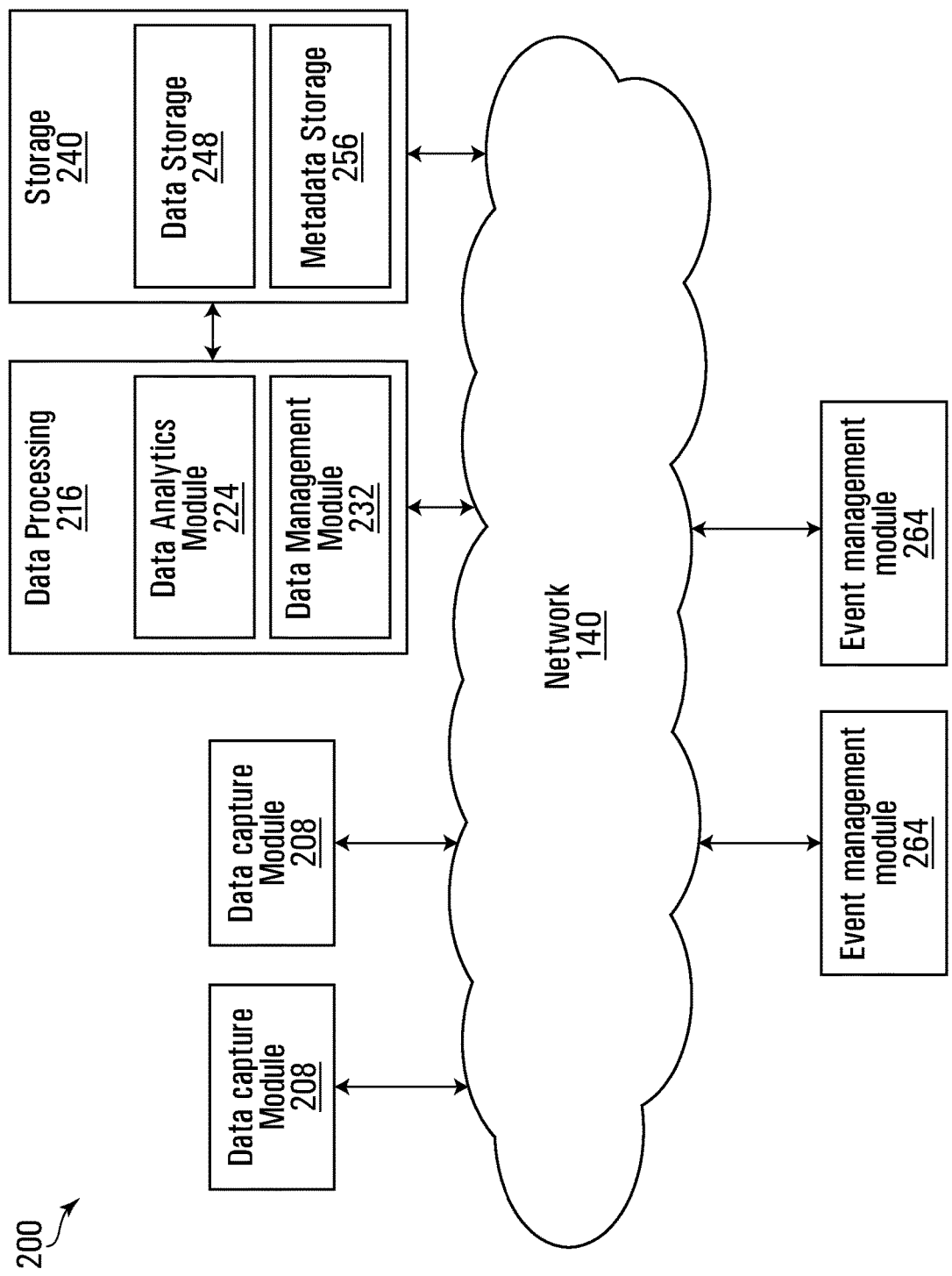
FIG. 2 illustrates a block diagram of a set of operational modules of the video surveillance system according to one example embodiment.

Referring now to FIG. 2, there is illustrated a block diagram of a set 200 of operational modules of the video surveillance system 100 according to one example embodiment. The operational modules may be implemented in hardware, software, or both on one or more of the devices of the video surveillance system 100 as illustrated in FIG. 1.

The set 200 of operational modules include at least one data capture module 208. For example, each of image capture device 108, sensor device 170, and device 180 may implement a data capture module 208. The data capture module 208 is operable to control one or more components (such as, for example, sensor 116) of an image capture device 108 (or sensor device 170 or device 180) to capture images and other data.

The set 200 of operational modules includes a data processing module 216. For example, and as illustrated, the data processing module 216 includes a data analytics module 224 and a data management module 232.

The data analytics module 224 receives data (such as images) and analyzes the data to determine properties or characteristics of the captured data and/or of objects and/or events found in the scene represented by the image, video, or data. Based on the determinations made, the data analytics module 224 may further output metadata providing information about the determinations or events.

Examples of determinations made by the data analytics module 224 may include one or more of foreground/background segmentation, object detection, object tracking, object classification, virtual tripwire, anomaly detection, facial detection, facial recognition, license plate recognition, identifying objects "left behind" or "removed", monitoring objects (such as, for example, to protect from stealing), and business intelligence. However, it will be understood that other data analytics functions known in the art may also be implemented by the data analytics module 224 such as fire event detection and earthquake event detection.

The data management module 232 receives the data (such as image data) and performs processing functions on the data related to transmission, playback, and/or storage. For example, the data management module 232 can process the data to permit transmission of the data according to bandwidth requirements and/or capacity. The data management module 232 may also process the data according to playback capabilities of a client device 164 (as shown in FIG. 1) that will be playing back the data, such as processing power and/or resolution of the display of the client device 164. The data management module 232 may also process the data according to storage capacity within the video surveillance system 100 for storing the data.

It will be understood that according to some example embodiments, the data processing module 216 may include only one of the data analytics module 224 and the data management module 232.

The set 200 of operational modules further include a storage module 240. For example, and as illustrated, the storage module 240 includes a data storage module 248 and a metadata storage module 256. The data storage module 248 stores image data, which may be data processed by the data management module 232. The metadata storage module 256 stores information data outputted from the data analytics module 224.

It will be understood that while data storage module 248 and metadata storage module 256 are illustrated as separate modules, they may be implemented within a same hardware storage device whereby logical rules are implemented to separate stored data/video from stored metadata. In other example embodiments, the data storage module 248 and/or the metadata storage module 256 may be implemented within a plurality of hardware storage devices in which a distributed storage scheme may be implemented. In at least some example embodiments in which distributed storage is used, some video and/or metadata may be stored locally to the video surveillance system 100, and some video and/or metadata may also be stored on distributed storage remote from the system 100, such as on cloud storage. For example, video and/or metadata of an entire event may be stored locally on the system 100, and select portions of that video and/or metadata may be concurrently stored on cloud storage. As another example, video and/or metadata may be stored, in its entirety, both locally and on cloud storage for backup purposes. As another example, some video and/or metadata may be stored locally, and additional video and/or metadata may be stored on cloud storage, with the data stored locally differing from the data stored on cloud storage.

The set of operational modules further includes at least one event management module 264, which may be implemented on the client device 164 and/or the workstation 156. Each of the client device 164 and the workstation 156 is an example of an "event notification handling device". The event management module 264 is operable to receive and play back the data (when the data comprises video data); and to receive event notifications (when the data comprises notifications in response to events, such as those detected by the data analysis module 224 and/or triggered by sensor devices 170 such as smoke detectors). Devices that send event notifications to the event notification handling device, such as the sensor devices 170, are "event notification sending devices". The event management module 264 handles the event notifications by performing actions associated with and in response to the events. These actions are specified by rules, as discussed further below.

The event management module 264 natively recognizes "standard event notifications", which are notifications for "standard events". A standard event refers to an event that is listed in a standard events list, which is accessible by the event management module 264. The standard events list may, for example, be expressed in a software module or other data file, such as an XML file, that is stored on a device of the video surveillance system 100 prior to being delivered to a user. The standard events list may in at least some example embodiments be editable by the end user such as, for example, when the standard events list is an XML file. In at least some other example embodiments, the list of standard events may not be editable by the end user. For example, the system 100 manufacturer may express the list of standard events in source code, compile the source code to generate the event management module 264 in object code, and ship only the object code to the end user.

The standard events list also stores a standard format for each of the standard event notifications. When the event management module 264 receives a standard event notification from an event notification sending device in the standard format, the event management module 264 processes the standard event notification by referring to the standard events list to determine the notification's format, which permits the event management module 264 to properly process the notification. For example, a standard event named "Smoke Detection" that is generated by an event notification sending device in the form of a smoke detector may be formatted as a simple binary signal, with a value of "1" representing smoke having been detected and a value of "0" representing smoke no longer being detected. The event management module 264 in this example, when it receives a Smoke Detection event notification, knows how to process the binary signal comprising the notification by referring to the standard events list. The standard events list may reflect the ONVIF specification, for example.

In at least some example embodiments, even if an event notification sending device is asserted to be ONVIF compliant, the device may generate standard event notifications that are in a non-standard format. Using the Smoke Detection event above as an example, the smoke detector may send Smoke Detection event notifications that are formatted to be "0" if no smoke is detected, "1" if a first concentration of smoke is detected, and "2" if a second and higher concentration of smoke is detected. As the Smoke Detection event is listed in the standard events list, the notification is deemed to be a standard event notification. However, because the notification's format is not as defined in the standard events list, the notification is in a non-standard format. The event management module 264 is accordingly unable to process a value of "2" for the event notification by referring only to the standard events list. Furthermore, even though the event management module 264 can process an event notification value of "1", it does not determine, by referring only to the standard events list, that the value of "1" refers to a particular concentration of smoke, as opposed to merely the presence of smoke.

Furthermore, in at least some example embodiments, the event notification sending device may send event notifications for events that are not standard events ("non-standard events"); that is, the non-standard event does not correspond to any of the events in the standard events list. For example, in at least some example embodiments a non-standard event may be "Object Detected", representing that an event notification sending device in the form of the image capture device 108 has detected a certain object-of-interest, such as a vehicle. If the Object Detected event is not defined in the standard events list, it is a "non-standard event" expressed in a "non-standard format", with the notification corresponding to the non-standard event being a "non-standard event notification". One example of a "non-standard event" is a "manually-defined event", which is a non-standard event having a format manually defined by a person. The person may, for example, be a user of the video surveillance system 100, in which case the manually-defined event is referred to interchangeably herein as a "user-defined event" having a corresponding "user-defined event notification". The format of the user-defined event notification is defined in a list of events in non-standard formats, which may for example be an XML script as discussed in more detail in respect of FIG. 4, below. The list of non-standard formats may also in at least some example embodiments define non-standard formats used for standard event notifications.

In at least some example embodiments, user-defined events may comprise any one or more of an Object Detected event, a Person Detected event (i.e., an Object Detected event in which the detected object is a person), a Person Detected at a Location event (i.e., a Person Detected event in which the person is detected at a particular location), a Fire Detected event (i.e., a fire has been detected, such as by using a smoke or heat detector), an Image Chip of Detected Person Present event (i.e., a person whose image is within a bounding box generated by the data analytics module 224 has been detected), and a Tampering Detected event (i.e., tampering of a device of the video surveillance system 100 has been detected). It is technically difficult to encode all possible events and encoding formats into the system 100. As mentioned above, even among known events and formats, vendor specific implementations may be non-compliant with a specification (such as, for example, the ONVIF specification). For the events and formats not supported by the video surveillance system 100 as standard events, certain embodiments herein provide the capability for the system 100 to be configured to nonetheless recognize and process non-standard event notifications. For example, for user-defined event notifications, users may specify to the system 100 how to recognize those event notifications in their non-standard formats through a definition file such as, for example, an XML script. Following recognition of the non-standard event notification, certain embodiments herein perform an action in accordance with a rule in response to the non-standard event notification. The rules in at least some example embodiments may be set up by users of the system 100; alternatively or additionally, the rules may be otherwise established, such as by being preconfigured by the device manufacturer.

Figure 3:
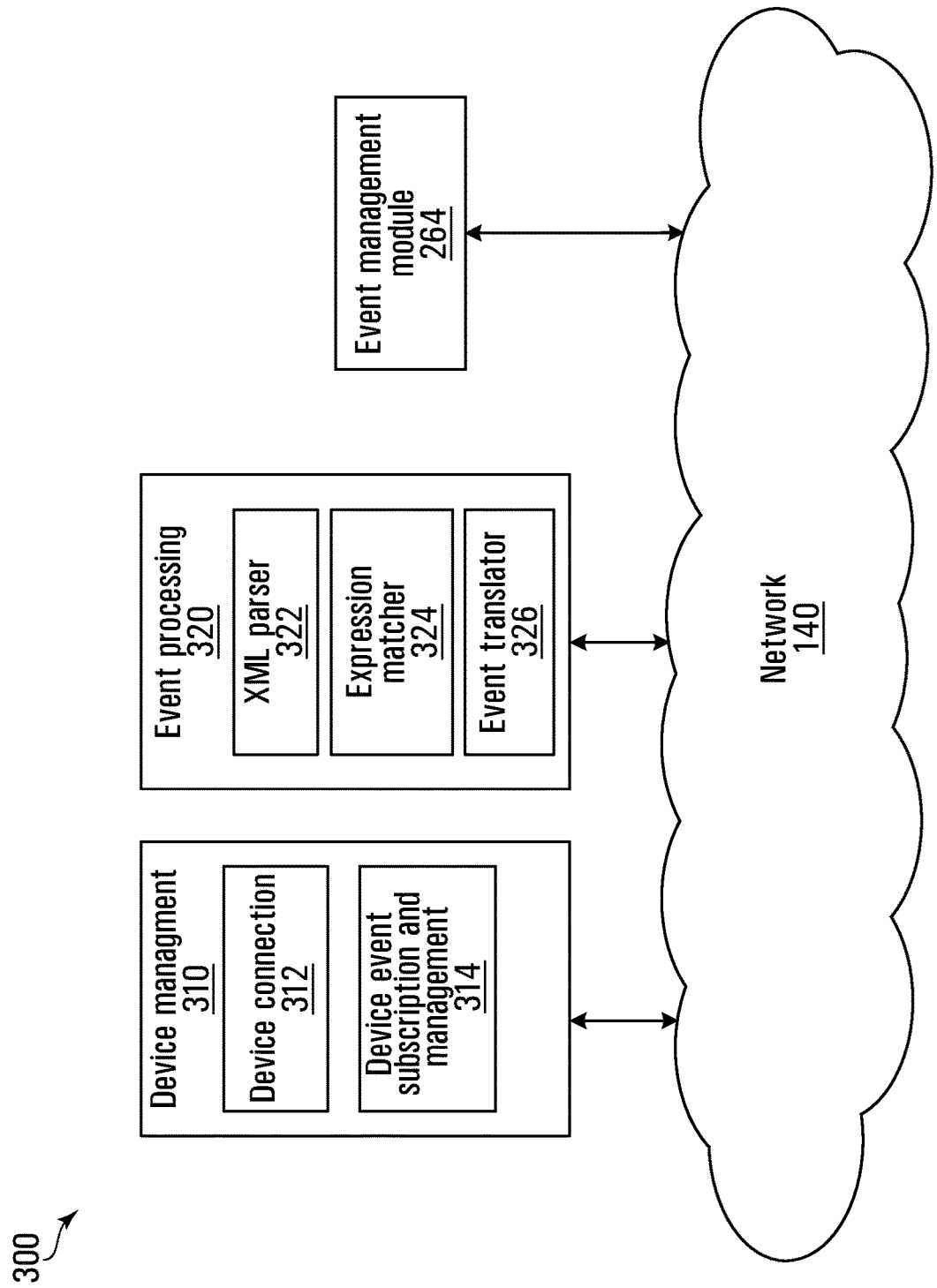
FIG. 3 illustrates a block diagram of a further set of operational modules of the video surveillance system according to one example embodiment.

Referring now to FIG. 3, there is illustrated a block diagram of a further set 300 of operational modules of the video surveillance system 100 according to one particular example embodiment. The operational modules may be implemented in hardware, software, or both on one or more of the devices of the video surveillance system 100 as illustrated in FIG. 1.

The further set 300 comprises a device management module 310 and an event processing module 320. The device management module 310 comprises a device connect module 312 and a device event subscription and management module 314. The device management module 310 manages IP enabled devices or processing appliances. The device connection module 312 manages the connections with the image capture devices 108, the sensor devices 170 and, through the processing appliance 148, the devices 180. For example, the device connection module 312 communicates or connects using ONVIF protocols with ONVIF compliant devices such as the image capture devices 108, the sensor devices 170 and, through the processing appliance 148, the devices 180.

When the devices 108, 170, 180 are connected, the device event subscription and management module 314 queries the devices 108, 170, 180 for a list of events supported by the devices, whether they be standard or non-standard. The end user is able to view this list of events and, for those events that are non-standard, choose the events to subscribe to by encoding them in an XML script in a defined format. In this context, the end user "subscribing" means that the devices 108, 170, 180 are requested to send notifications of the subscribed events that occurred or are detected on the respective devices 108, 170, 180 to the event management module 264.

Referring to FIG. 4, there is listed a script block (a part) of an XML script for a "Face Detection" event according to one particular example embodiment. The Face Detection event is a non-standard event not natively supported by the event management module 264; that is, the Face Detection event is not in the standard events list. The 'DeviceEvent Name="FaceDetection"' script 410 shows that the name "FaceDetection" is the name of the non-standard event, as specified by a third party manufacturer. The 'ACCEvent Name="Face Detection Events"' 420 shows the name "Face Detection Events" as one of the user-defined events in the event management module 264. The "<SimpleItemDescription Name="RegexEventDataToken Name" value="^Face$"/> <SimpleItemDescription Name="RegexEventDataStartTokenValue" value="^(1)$"/> <SimpleItemDescription Name="RegexEventDataEndTokenValue" value="^(0)$"/>' script 430 shows a mapping of fields of the user-defined event (the RegexEventData*values) to analogous fields of the Face Detection event notification as sent from the third party camera (for example, the image capture device 108). Accordingly, an example of a complete XML script has a number of script blocks to define other non-standard events as user-defined events in the event management module 264.

Referring to FIG. 3 again, the event processing module 320 comprises an XML parser 322, an expression matcher 324, and an event translator 326. The XML parser 322 reads and parses the XML script defined above to receive the user's selection of subscribed events. Upon receiving event notifications from the device 108, for example, the expression matcher 324 attempts to match any received user-defined event notifications with the list of user-defined events as defined in the XML script. If a match is found, the event translator 326 translates the received event notification into a user-defined event notification, which is presented to the event management module 264 to be handled. The event management module 264 has a user-defined action configuration (i.e., a rule) and executes an action upon occurrence of a selected event, such as the Face Detection event.

Figure 5A:
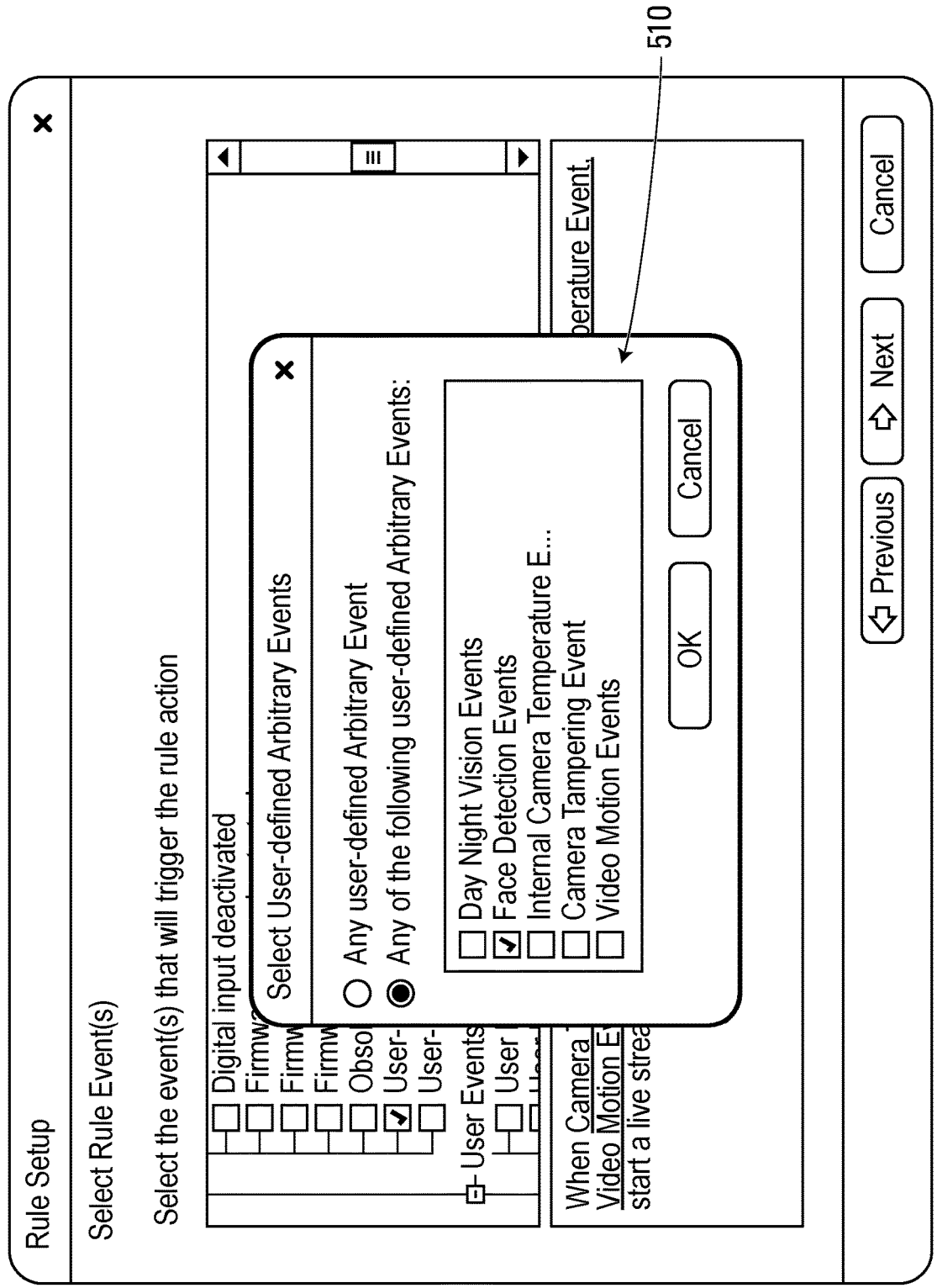
FIGS. 5A, 5B, 5C, and 5D illustrate a series of screenshots of an example embodiment of the event management module showing an example sequence for setting up a rule to apply an action.

Referring to FIGS. 5A, 5B, 5C, and 5D, there is illustrated a series of screenshots of an embodiment of the event management module 264 showing an example sequence for setting up a rule to apply an action. Referring to FIG. 5A, "Face Detection Events" is selected from box 510, which shows a list of user-defined events. The other user-defined events, "Day Night Vision Events", "Internal Camera Temperature Events", "Camera Tampering Events", and "Video Motion Events" were entered into the event management module 264 through the XML script as prepared by a user.

Figure 5B:
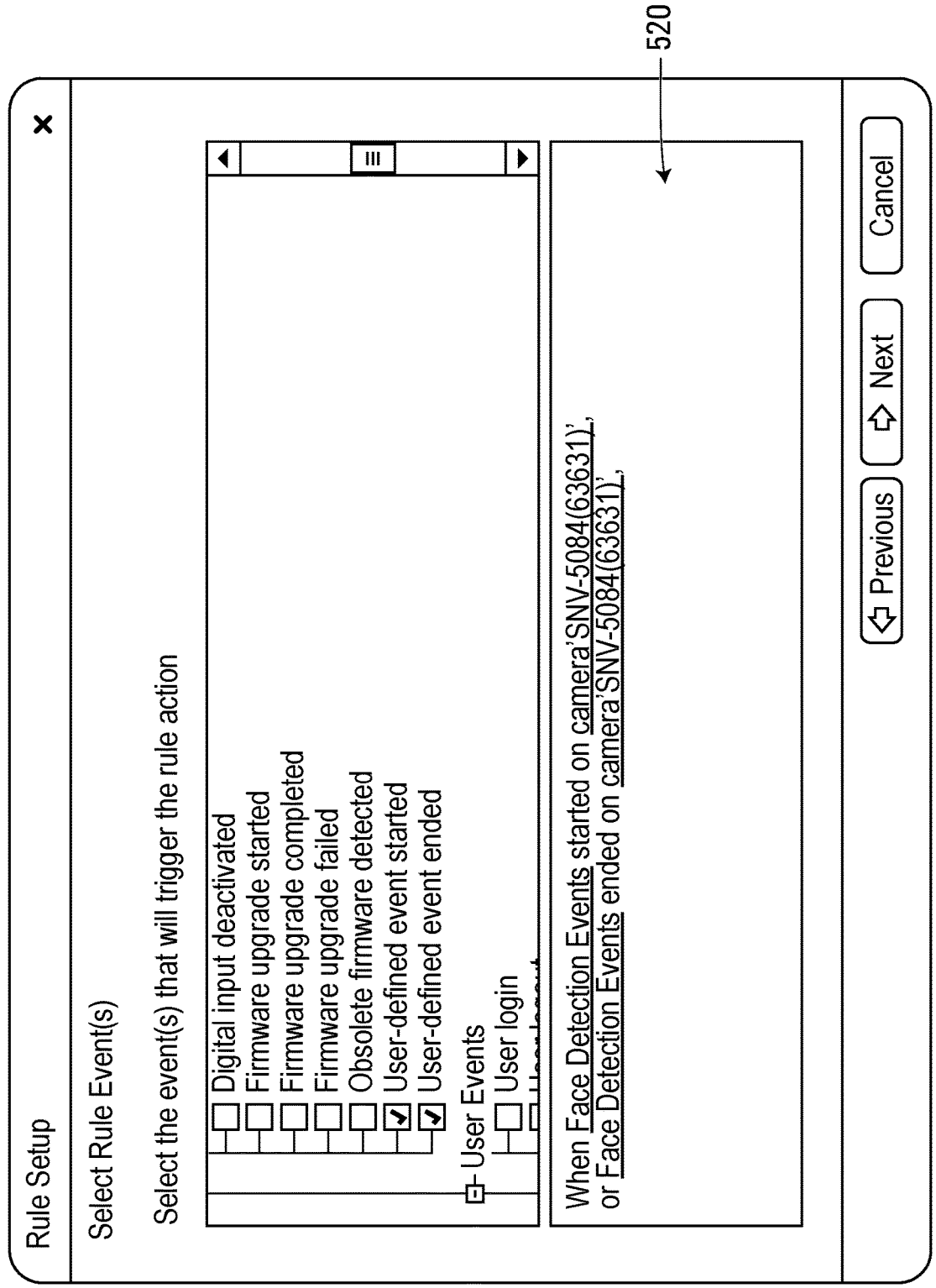
Figure 5C:
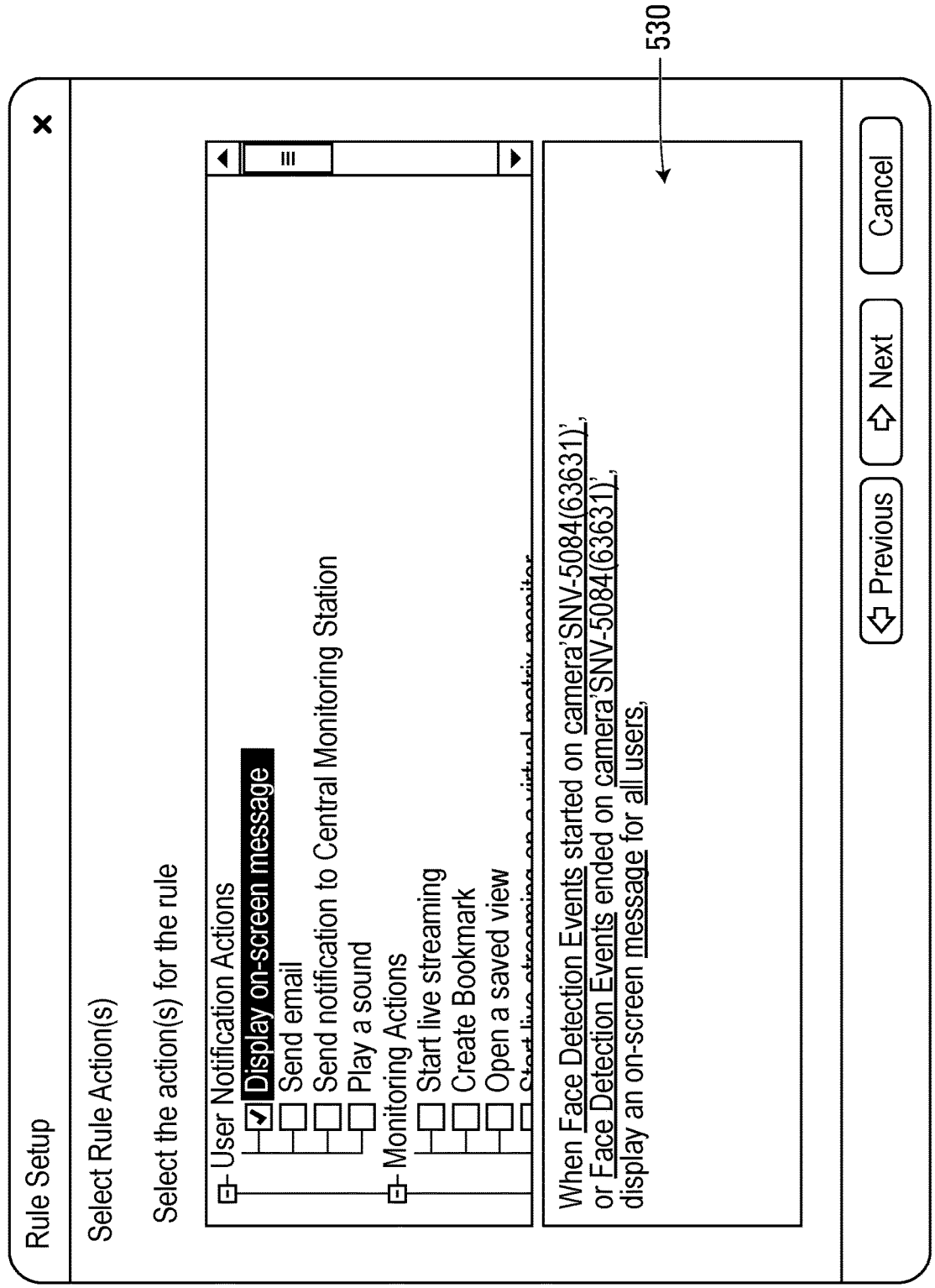
Figure 5D:
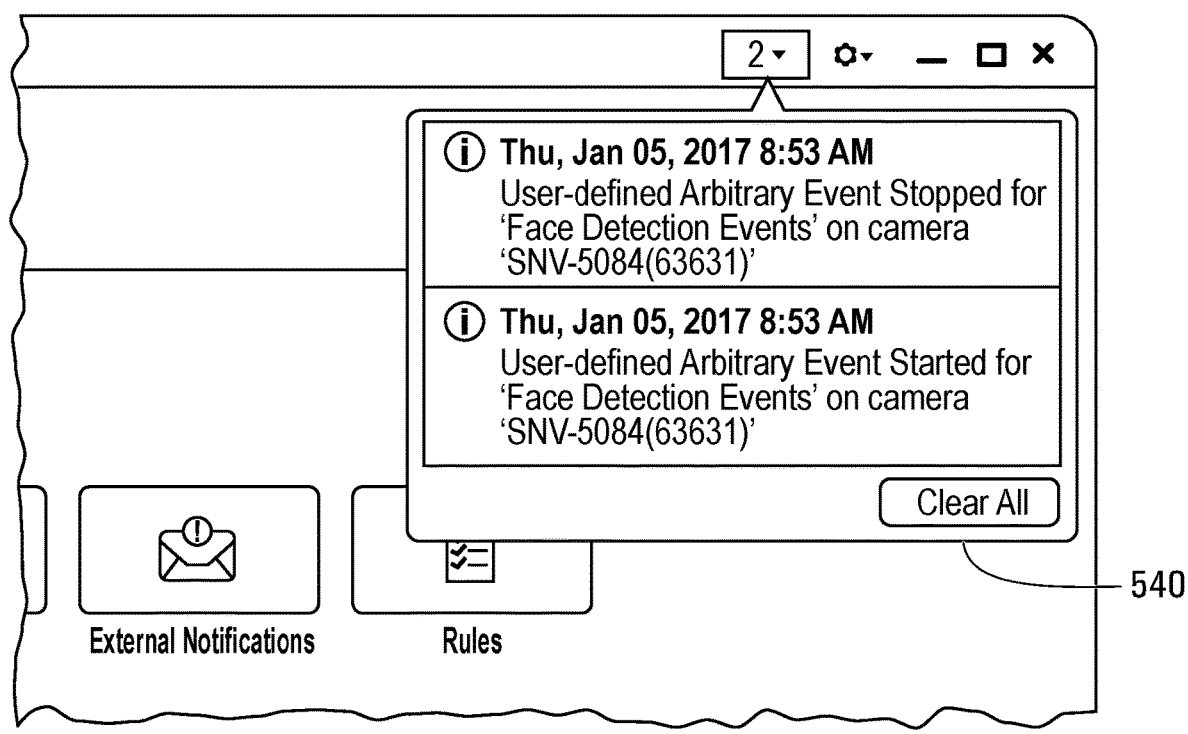

Referring to FIG. 5B, there is illustrated in a window 520 a rule initiated when a Face Detection event is received by the event management module 264. In this example, the Face Detection event is received from the image capture device 108, which is camera SNV-5084(63631). Referring to FIG. 5C, there is illustrated at a window 530 that the rule further comprises performing an action, "display an on-screen message for all users" when the Face Detection event occurs and the user-defined event notification is consequently received. Referring to FIG. 5D, there is illustrated a screenshot of the messages displayed in a notifications window 540 when the rule is triggered and the action performed.

The operational modules of the sets 200, 300 may be implemented on one or more of the image capture device 108, sensor device 170, device 180, processing appliance 148, workstation 156, and client device 164. In some example embodiments, an operational module may be wholly implemented on a single device. For example, data analytics module 224 may be wholly implemented on the workstation 156. Similarly, event management module 264 may be wholly implemented on the workstation 156.

In other example embodiments, some functionalities of an operational module of the sets 200, 300 may be partly implemented on a first device while other functionalities of an operational module may be implemented on a second device. For example, data analytics functionality may be split between one or more of image capture devices 108, sensor devices 170, devices 180, processing appliance 148, and workstation 156. Similarly, video management functionality may be split between one or more of an image capture device 108, sensor device 170, device 180, processing appliance 148, and workstation 156.

Figure 6:
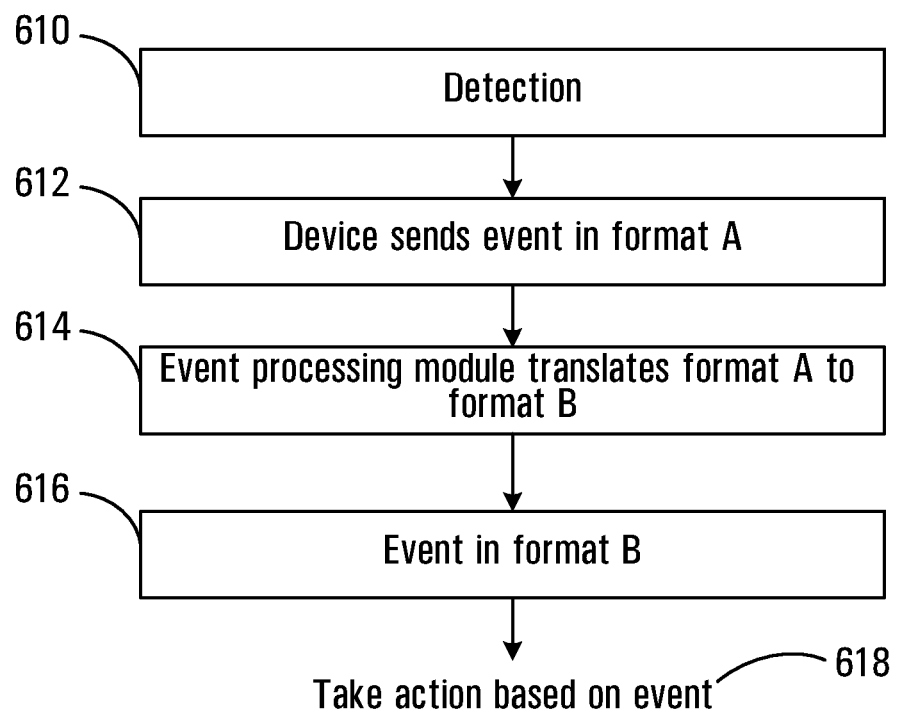
FIG. 6 illustrates a flowchart of an example embodiment of a method for supporting an example device of the video surveillance system.

Referring to FIG. 6, there is illustrated a flowchart of an example embodiment of a method for supporting an example event notification sending device of the video surveillance system 100. The example device may be any of the image capture device 108, the sensor device 170, and the device 180, for example. At block 610, the example device detects an example event; the event may be a standard event in a non-standard format or a non-standard event. When such events have been subscribed to by a user, the example device at block 612 sends an event notification of the example event in a non-standard format ("format A") to the event processing module 320. At block 614, the event processing module 320 translates the example event notification to a second format ("format B"), which differs from the first format. The example event notification that is translated into format B is one of (a) a standard event notification in a non-standard format; and (b) a non-standard event, such as a user-defined event, which is in a non-standard format. At block 616, the example event notification in format B is received by the event management module 264. At block 618, the rule associated with the example event is executed and any associated actions performed.

Figure 7:
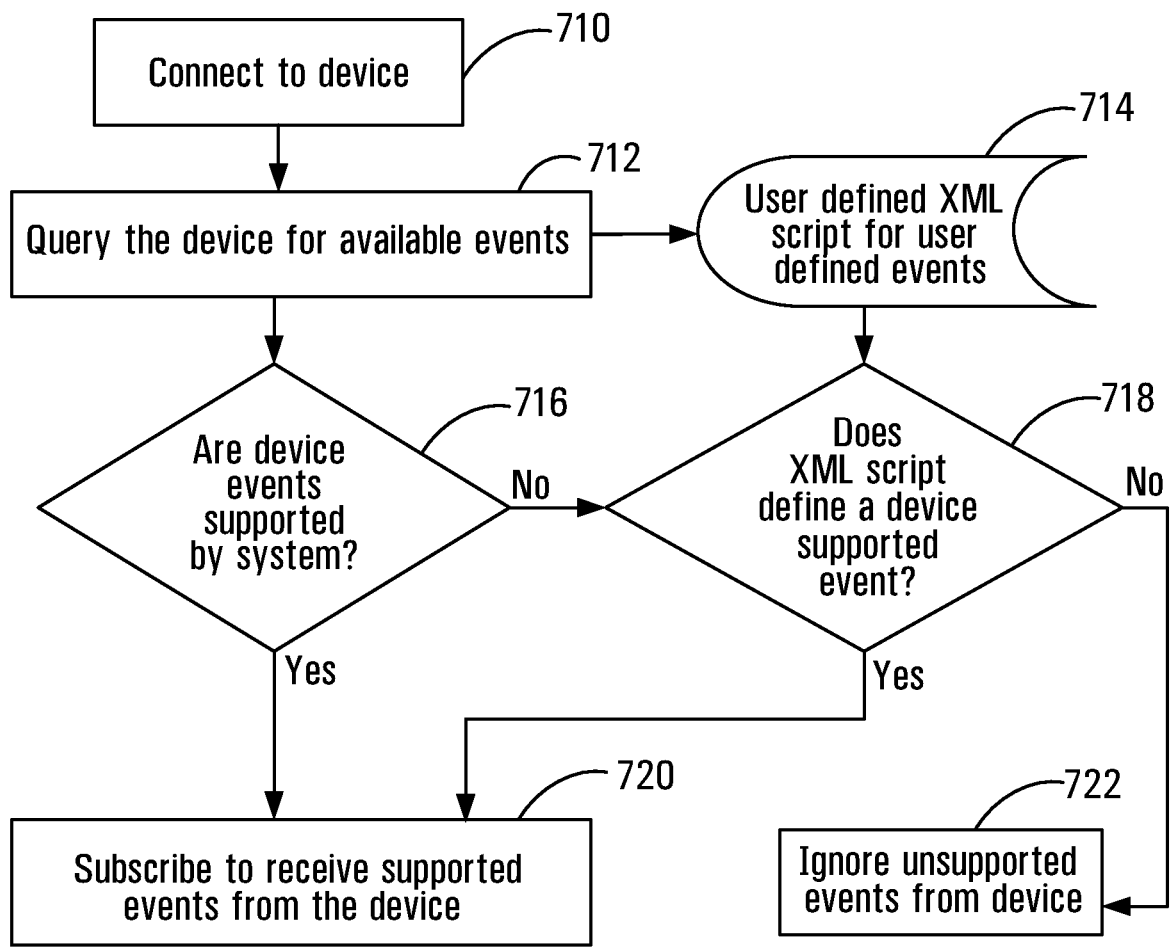
FIG. 7 illustrates a flowchart of an example embodiment of a method for configuring an example device of the video surveillance system.

Referring to FIG. 7, there is illustrated a flowchart of an example embodiment of a method for configuring an example device of the video surveillance system 100. The example device may be any of the image capture device 108, the sensor device 170, and the device 180, for example. At block 710, the video surveillance system 100 is connected to the example device. At block 712, the example device is queried for the events it supports, which may be standard or non-standard. At block 714, a user defines the user-defined events in an XML script, such as that shown in FIG. 4. As discussed above, in at least some different embodiments the XML script may also define standard events in non-standard formats, and non-standard events other than user-defined events to enable translation of those event notifications into a format the event management module 264 understands from the format the example device uses. At block 716, when events are identified that are natively supported by the event management module 264, the method proceeds to block 720 where the event is subscribed to so that the example device sends notifications of the event to the event management module 264 whenever it occurs at the example device. Alternatively, when the event is not natively supported by the system 100 (such as, for example, when the event is a non-standard event), the method proceeds to block 718. At block 718, the event management module 264 determines whether the event is defined in the XML script, such as when the event is a user-defined event. When the event is defined in the XML script, the method proceeds to block 720 where the event management module 264 subscribes to the event. Alternatively, if the event is not defined in the XML script, the method proceeds to block 722, the event management module 264 does not subscribe to the event, and events of this type are ignored. Ignoring an event may comprise, for example, the example device not receiving the event notification, or the event management module 264 receiving the event notification and taking no action.

While the above description provides examples of the embodiments using XML scripts as a means of configuring event handling, it will be understood that other formats may also be used for data exchange where data structured in a source schema (such as, for example, a non-standard format) is transformed into data structured in accordance with a target schema (such as, for example, a format understood by the event management module 264). Examples of such data exchange languages are XML, JSON, RDF, Atom, and YAML (see, for example, https://en.wikipedia.org/wiki/Data_exchange). Further, instead of an XML script, a software module may instead present a list of events supported by a connected device for the end user to select from. The software module may then directly input such events into the video surveillance system 100 without the need of an XML script. This may be done irrespective of whether such events are non-standard events generally, or manually-defined or user-defined events more particularly.

FIGS. 6 and 7 are flowcharts of example methods. Some of the blocks illustrated in the flowcharts may be performed in an order other than that which is described. Also, it should be appreciated that not all of the blocks described in the flowcharts are required to be performed, that additional blocks may be added, and that some of the illustrated blocks may be substituted with other blocks.

For the sake of convenience, at least some of the example embodiments above are described as various interconnected functional blocks or distinct software modules. This is not necessary, however, and there may be cases where these functional blocks or modules are equivalently aggregated into a single logic device, program, or operation with unclear boundaries. In any event, the functional blocks and software modules or features of the flexible interface can be implemented by themselves, or in combination with other operations in either hardware or software.

It is contemplated that any part of any aspect or embodiment discussed in this specification can be implemented or combined with any part of any other aspect or embodiment discussed in this specification.

The above discussed embodiments are considered to be illustrative and not restrictive, and the invention should be construed as limited only by the appended claims.

The invention claimed is:

1. A method comprising:
  receiving, at an event notification handling device of a video surveillance system, an event notification from an event notification sending device of the video surveillance system, wherein the event notification is in a format not natively supported by at least one device of the video surveillance system;
  translating, at the event notification handling device, the event notification into a format supported by the at least one device of the video surveillance system, wherein the format supported by the at least one device of the video surveillance system is defined in a list of non-standard formats, wherein the list of non-standard formats comprises a name of the event as generated by the event notification sending device, a name of a manually-defined event, and a mapping of fields of the event notification to fields of the manually-defined event;
  setting up a rule, comprising:
    displaying names of different manually-defined events, wherein the event notification received at the event notification handling device corresponds to one of the different manually-defined events;
    receiving a selection of the name of the manually-defined event corresponding to the event notification received at the event notification handling device;
    displaying actions to be performed in response to the event notification; and
    receiving a selection of one of the actions; and
  applying the rule associated with the event notification to perform an action, wherein applying the rule comprises performing the one of the actions in response to the event notification being received.

2. The method of claim 1, wherein the event notification sending device is a video surveillance camera.

3. The method of claim 1, wherein the event notification handling device is a workstation or client device.

4. The method of claim 1, wherein the event notification handling device and the event notification sending device are the same device.

5. The method of claim 1, wherein the event notification handling device and event notification sending device are different devices.

6. The method of claim 1, wherein the fields of the manually-defined event comprise a name of a token, a starting value of the token, and an ending value of the token.

7. The method of claim 1, wherein the list of non-standard formats is stored as a definition file, the definition file comprising a script expressed using a data exchange language.

8. The method of claim 1, further comprising, prior to receiving the notification, subscribing to receive the event notification from the event notification sending device.

9. The method of claim 8, further comprising, prior to subscribing to receive the event notification:
  querying the device for the list of events supported by the event notification sending device, wherein the list of events lists an event corresponding to the event notification;
  determining that the event corresponding to the event notification is not natively supported by the at least one device of the video surveillance system; and
  determining that the event corresponding to the event notification is listed in a definition file that defines a non-standard format for the event corresponding to the event notification.

10. The method of claim 1, further comprising:
  detecting, at the event notification sending device, an event; and
  sending the event notification in response to the event.

11. The method of claim 1, wherein the event represents motion having been detected, a person having been detected, or a camera having been tampered with.

12. A method comprising:
  connecting to an event notification sending device that comprises part of a video surveillance system;
  querying the event notification sending device for a list of events supported by the device;
  for each of at least one event comprising part of the list of events:

determining whether an event notification for the event supported by the device is in a non-standard format stored in a definition file; and when the event notification for the event supported by the device is in the non-standard format stored in the definition file, subscribing to receive the event notification from the device;

receiving, at an event notification handling device of the video surveillance system, the event notification in the non-standard format from the event notification sending device;

translating, at the event notification handling device, the event notification into a format supported by at least one other device of the video surveillance system, wherein the format supported by the at least one other device of the video surveillance system is defined in a list of non-standard formats, wherein the list of non-standard formats comprises a name of the event as generated by the event notification sending device, a name of a manually-defined event, and a mapping of fields of the event notification to fields of the manually-defined event;

setting up a rule, comprising:
displaying names of different manually-defined events, wherein the event notification received at the event notification handling device corresponds to one of the different manually-defined events;
receiving a selection of the name of the manually-defined event corresponding to the event notification received at the event notification handling device;
displaying actions to be performed in response to the event notification; and
receiving a selection of one of the actions; and applying the rule associated with the event notification to perform an action, wherein applying the rule comprises performing the one of the actions in response to the event notification being received.

13. The method of claim 12, further comprising, for each of the at least one event comprising part of the list of events and prior to determining whether the event notification is in the non-standard format stored in the definition file, determining that the event supported by the device is not natively supported by the at least one other device of the video surveillance system.

14. The method of claim 12, wherein the definition file is a script expressed using a data exchange language.

15. A video surveillance system for handling user-defined events, comprising:
an event notification sending device; and
an event notification handling device comprising a processor coupled to the event notification sending device, and a computer-readable storage device coupled to the processor, wherein the computer-readable storage device stores program instructions that, when executed by the processor, cause the processor to perform operations comprising:
receiving, from the event notification sending device, an event notification, wherein the event notification is in a format not natively supported by at least one device of the video surveillance system;
translating, at the event notification handling device, the event notification into a format supported by the at least one device of the video surveillance system, wherein the format supported by the at least one device of the video surveillance system is defined in a list of non-standard formats, wherein the list of non-standard formats comprises a name of the event as generated by the event notification sending device, a name of a manually-defined event, and a mapping of fields of the event notification to fields of the manually-defined event;
setting up a rule, comprising:
displaying names of different manually-defined events, wherein the event notification received at the event notification handling device corresponds to one of the different manually-defined events;
receiving a selection of the name of the manually-defined event corresponding to the event notification received at the event notification handling device;
displaying actions to be performed in response to the event notification; and
receiving a selection of one of the actions;
applying the rule associated with the event notification to perform an action, wherein applying the rule comprises performing the one of the actions in response to the event notification being received.

16. The system of claim 15, wherein the event notification sending device is a video surveillance camera.

17. The system of claim 15, wherein the event notification handling device is a workstation or client device.

18. The system of claim 15, wherein the event notification handling device and the event notification sending device are the same device.

19. The system of claim 15, wherein the event notification handling device and event notification sending device are different devices.

20. The system of claim 15, wherein the fields of the manually-defined event comprise a name of a token, a starting value of the token, and an ending value of the token.

21. The system of claim 15, wherein the list of non-standard formats is stored as a definition file, the definition file comprising a script expressed using a data exchange language.

22. The system of claim 15, wherein the operations further comprise, prior to receiving the notification, subscribing to receive the event notification from the event notification sending device.

23. The system of claim 22, wherein the operations further comprise, prior to subscribing to receive the event notification:
querying the device for the list of events supported by the event notification sending device, wherein the list of events lists an event corresponding to the event notification;
determining that the event corresponding to the event notification is not natively supported by the at least one device of the video surveillance system; and
determining that the event corresponding to the event notification is listed in a definition file that defines a non-standard format for the event corresponding to the event notification.

24. The system of claim 15, wherein the operations further comprise:
detecting, at the event notification sending device, an event; and
sending the event notification in response to the event.

25. The system of claim 15, wherein the event represents motion having been detected, a person having been detected, or a camera having been tampered with.

26. A video surveillance system for handling user-defined events, comprising:
an event notification sending device;
at least one additional device;

an event notification handling device comprising a processor coupled to the event notification sending device and the at least one additional device, and a computer-readable storage device coupled to the processor, wherein the computer-readable storage device stores program instructions that, when executed by the processor, cause the processor to perform operations comprising:

connecting to the event notification sending device;

querying the event notification sending device for a list of events supported by the event notification sending device;

for each of at least one event comprising part of the list of events:

determining whether an event notification for the event supported by the event notification sending device is in a non-standard format stored in a definition file; and when the event notification for the event supported by the event notification sending device is in the non-standard format stored in the definition file, subscribing to receive the event notification from the device;

receiving, at the event notification handling device, the event notification in the non-standard format from the event notification sending device;

translating, at the event notification handling device, the event notification into a format supported by the at least one additional device, wherein the format supported by the at least one additional device is defined in a list of non-standard formats, wherein the list of non-standard formats comprises a name of the event as generated by the event notification sending device, a name of a manually-defined event, and a mapping of fields of the event notification to fields of the manually-defined event;

setting up a rule, comprising:

displaying names of different manually-defined events, wherein the event notification received at the event notification handling device corresponds to one of the different manually-defined events;

receiving a selection of the name of the manually-defined event corresponding to the event notification received at the event notification handling device;

displaying actions to be performed in response to the event notification; and receiving a selection of one of the actions; and applying the rule associated with the event notification to perform an action, wherein applying the rule comprises performing the one of the actions in response to the event notification being received.

27. The system of claim 26, wherein the operations further comprise, for each of the at least one event comprising part of the list of events and prior to determining whether the event notification is in the non-standard format stored in the definition file, determining that the event supported by the event notification sending device is not natively supported by the at least one additional device.

28. The system of claim 26, wherein the definition file is a script expressed using a data exchange language.

29. The system of claim 26, wherein the event notification sending device is a video surveillance camera.

30. A non-transitory computer readable medium having stored thereon computer program code that is executable by a processor and that, when executed by the processor, causes the processor to perform a method, comprising:

receiving, at an event notification handling device of a video surveillance system, an event notification from an event notification sending device of the video surveillance system, wherein the event notification is in a format not natively supported by at least one device of the video surveillance system;

translating, at the event notification handling device, the event notification into a format supported by the at least one device of the video surveillance system, wherein the format supported by the at least one device of the video surveillance system is defined in a list of non-standard formats, wherein the list of non-standard formats comprises a name of the event as generated by the event notification sending device, a name of a manually-defined event, and a mapping of fields of the event notification to fields of the manually-defined event;

setting up a rule, comprising:

displaying names of different manually-defined events, wherein the event notification received at the event notification handling device corresponds to one of the different manually-defined events;

receiving a selection of the name of the manually-defined event corresponding to the event notification received at the event notification handling device;

displaying actions to be performed in response to the event notification; and receiving a selection of one of the actions; and applying the rule associated with the event notification to perform an action, wherein applying the rule comprises performing the one of the actions in response to the event notification being received.

31. A non-transitory computer readable medium having stored thereon computer program code that is executable by a processor and that, when executed by the processor, causes the processor to perform a method, comprising:

connecting to an event notification sending device that comprises part of a video surveillance system;

querying the event notification sending device for a list of events supported by the device;

for each of at least one event comprising part of the list of events:

determining whether an event notification for the event supported by the device is in a non-standard format stored in a definition file; and when the event notification for the event supported by the device is in the non-standard format stored in the definition file, subscribing to receive the event notification from the device;

receiving, at an event notification handling device of the video surveillance system, the event notification in the non-standard format from the event notification sending device;

translating, at the event notification handling device, the event notification into a format supported by at least one other device of the video surveillance system, wherein the format supported by the at least one other device of the video surveillance system is defined in a list of non-standard formats, wherein the list of non-standard formats comprises a name of the event as generated by the event notification sending device, a name of a manually-defined event, and a mapping of fields of the event notification to fields of the manually-defined event;

setting up a rule, comprising:

displaying names of different manually-defined events, wherein the event notification received at the event notification handling device corresponds to one of the different manually-defined events;

receiving a selection of the name of the manually-defined event corresponding to the event notification received at the event notification handling device;
displaying actions to be performed in response to the event notification; and
receiving a selection of one of the actions; and
applying the rule associated with the event notification to perform an action, wherein applying the rule comprises performing the one of the actions in response to the event notification being received.

* * * * *